United States Patent [19]
LeFeuvre

[11] 3,727,406
[45] Apr. 17, 1973

[54] THROTTLE VALVE

[75] Inventor: Thomas LeFeuvre, Ottawa, Ontario, Canada

[73] Assignee: Thermo Electron Corporation, Waltham, Mass.

[22] Filed: Jan. 6, 1972

[21] Appl. No.: 215,837

[52] U.S. Cl. ..........................60/108, 60/36, 60/95, 251/335 B
[51] Int. Cl. ......F16k 21/00, F01d 17/00, F01d 25/00
[58] Field of Search.....................251/335 B; 60/108, 60/95

[56] References Cited

UNITED STATES PATENTS

| | | | |
|---|---|---|---|
| 1,806,447 | 5/1931 | Carson, Jr. | 251/335 B |
| 1,901,456 | 3/1933 | Kinsman | 251/335 B X |
| 1,992,902 | 2/1935 | McIntosh | 251/335 B X |

*Primary Examiner*—Martin P. Schwadron
*Assistant Examiner*—Allen M. Ostrager
*Attorney*—James L. Neal

[57] ABSTRACT

A throttle valve for use in a closed fluid cycle engine where the fluid is passed through the valve at high temperature and pressure and where the engine includes portions of the fluid cycle having the fluid at low pressure. The valve stem is hermetically sealed to the housing by means of a bellows seal enclosed in a chamber which is vented to the low pressure portion of the engine. A seal such as a laminar seal or a labyrinth seal encloses the valve stem between the high pressure gas inlet and outlet and the bellows chamber. This stem seal produces a pressure drop protecting the bellows from the effects of high pressure and limits the fluid flow from the valve inlet and outlet to the bellows chamber to less than 5 percent of the total fluid flow through the valve.

5 Claims, 3 Drawing Figures

PATENTED APR 17 1973        3,727,406

3,727,406

THROTTLE VALVE

Field of the Invention

This invention relates in general to throttle valves and more particularly to a hermetically sealed throttle valve for use in a Rankine cycle engine.

BACKGROUND OF THE INVENTION

In a Rankine cycle engine the throttle valve controls the flow of vaporized fluid from the vapor generator into the expander. Thus the vapor at this point in the cycle is at both high temperature and high pressure, typically several hundred pounds per square inch pressure and temperature between 200° and 300°F. From both the economics and safety point of view, it is necessary to seal the valve to prevent any escape of the working fluid from the engine. Where the throttle valve has a linear stroke it is necessary to provide a hermetic seal for a reciprocating valve stem, which seal can withstand the extremes of temperature and pressure involved. The conventional method of hermetically sealing a reciprocating valve stem is to employ a bellows, usually formed of metal, and sealed to both the stem and the housing of the valve to allow appropriate reciprocating movement. However, bellows seals, formed from materials which can withstand the temperatures involved, typically operate with a differential pressure no greater than 100 pounds per square inch. While bellows valves have been employed to operate at higher pressures, the materials involved are not usually suitable for high temperature operation.

BRIEF SUMMARY OF THE INVENTION

Broadly speaking, the valve of the present invention employs a bellows seal of conventional construction to seal the valve stem to provide a hermetic seal between the valve stem and the housing. In the closed position the tip of the valve stem is engaged with a seat in the valve body and thereby shuts off flow of the working fluid through the valve into the expander of the engine. In order to open the valve, the stem is moved along the direction of its length so that its tip withdraws from the seat, thereby permitting flow of the high temperature, high pressure working fluid through the conduit forming the valve inlet and out through the conduit forming the valve outlet. Between the tip of the valve stem and the bellows seal is a shaft seal. The shaft seal may be formed by the stem extending through a close fitting bore in the valve housing. At the bellows end of the valve stem, this bore is enlarged into a chamber which encases the bellows and which includes a vent outlet to a low pressure point within the engine system, for example, to the condenser. This combination of a bellows seal encased in a chamber vented to a low pressure part of the system and isolated from the high pressure end of the valve stem by a shaft seal allows a hermetically sealed bellows type of valve to be employed with a high temperature, high pressure working fluid. The shaft seal provides for a pressure drop between the high pressure volume of vapor adjacent to the inlet conduit of the valve and the low pressure chamber surrounding the bellows. The vent to low pressure portion of the engine system prevents any buildup of a high pressure within the chamber surrounding the bellows.

DESCRIPTION OF PREFERRED EMBODIMENTS

Figure 1:
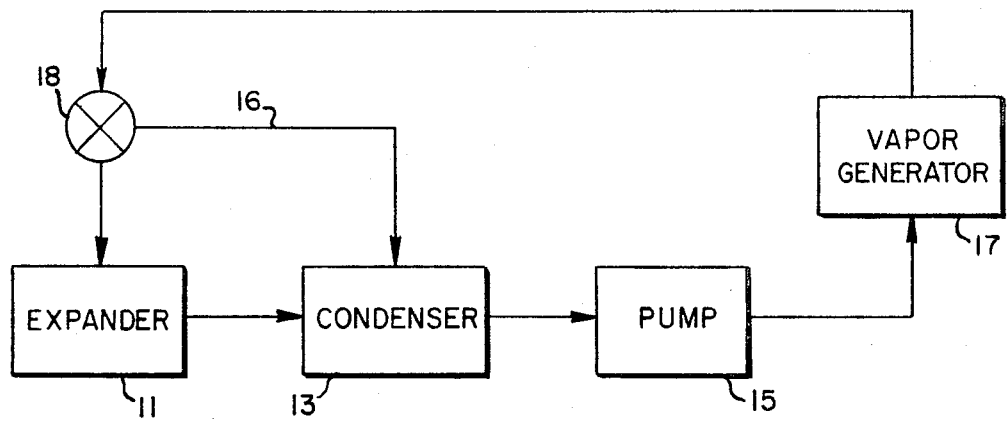
FIG. 1 is an illustration in block diagrammatic form of a closed fluid cycle engine.

With reference now to FIG. 1, there is illustrated in block diagrammatic form a closed cycle fluid engine, such as a Rankine cycle engine. The engine includes an expander 11 in which the working fluid in vapor form supplied from a vapor generator 17 through a throttle valve 18 is expanded to provide the actuating force for the work producing elements of the expander. Vapor from the expander 11 is then exhausted to a condenser 13 where it is condensed back into its liquid form then delivered through the action of pump 15 to the vapor generator 17. The vapor generator 17, which generally is in the form of a boiler, heats the liquid to vaporize it within a confined volume and thus produces a high-pressure, high-temperature gas which is delivered to the inlet of the throttle valve 18. After expansion, in the expander 11 the vapor is at low pressure and relatively low temperature and is condensed back into a liquid in the condenser 13, which is therefore at low pressure. A bleed line 16 couples a venting port in the valve 18 to the low pressure volume of the condenser 13.

It will be understood that FIG. 1 is a simplified diagram of a typical engine and that, in the usual case, a number of additional elements would be included. While the working fluid of the engine may be any of several different appropriate materials, suitable examples are trifluoroethanol, trifluoroethanol and water mixtures and thiophane. With these materials, as with many other suitable fluids, both the economics and the safety factors of operation of the engine dictate that the fluid shall be completely enclosed within a sealed system. Typical conditions for the working fluid in the vapor state entering the throttle valve 18 are a pressure in the range of 100 to 1000 pounds per square inch and a temperature in the range of 100° to 800°F.

Figure 2:
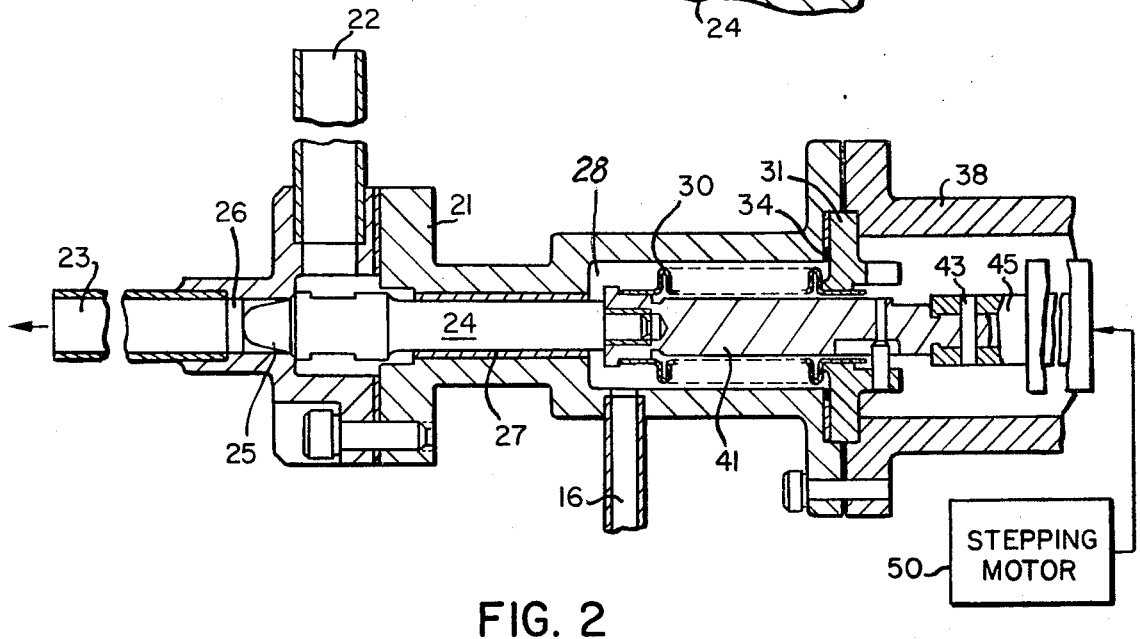
FIG. 2 is an illustration in cross sectional view of a valve constructed in accordance with the principles of this invention.

A detailed cross sectional view of the valve 18 of FIG. 1 is shown in FIG. 2. The valve housing 21 includes an inlet conduit 22 and an outlet conduit 23. A valve stem 24 has a shaped tip 25 arranged to engage a valve seat 26 at the orifice of outlet conduit 23. The valve stem 24 extends through a seal at the bore 27 of the housing 21 and into a substantially larger diameter bore chamber 28 within the housing 21. The valve stem 24 is sealed within the chamber 28 to a bellows seal 30 which is also attached with a hermetic seal to a bellows flange element 31, the latter being sealed by means of an O-ring 34 to the valve housing 21. The bellows seal may be a conventional bellows seal, formed of any one of a number of suitable materials such as a stainless steel, brass, beryllium, Teflon, Viton and other materials capable of chemically withstanding the working fluid and tolerating the temperatures and pressures encountered within chamber 28. The flange 31 is mechanically pressed against spacer ring 36 and O-ring 34 by means of a coupling housing 38 which is fastened to the valve housing 21 by means of bolts 40. A vent tube 16 venting chamber 28 is connected to a low pressure portion of the engine system. The bellows rod 41 which is coupled directly to the valve stem 24 at one end is also coupled through a roll pin assembly 43 to a ball screw assembly 45 which provides for the longitudinal motion of the valve stem 24 in response to the action of the driving stepping motor 50. The roll pin 43 prevents any torque being communicated from the ball screw assembly to the bellows seal 30. The valve housing 21 and the coupling housing 38 may be formed of any suitable material, for example, brass.

Operationally, translational motion of the valve stem 24 occurs between an innermost position in which the valve tip 25 is engaged with the valve seat 26 and a retracted position in which the valve is fully opened and the gas flows through the maximum orifice from the inlet conduit 22 through the outlet conduit 23. While the action of the valve in terms of the percentage of maximum flow produced for any stem position is a function of the particular design, one suitable shape of the valve tip 25 provides for the percentage change in opening to correspond with the percent of the total stroke change of the valve stem position. Thus, for example, a 1 percent change in the translational position of the valve stem will result in a 1 percent change in the flow rate through the valve itself.

As above indicated, in order to protect the bellows from the high temperature and high pressure of the gas coming through the inlet conduit 22, the bore 27 of the valve housing is maintained at a very close tolerance to the outer diameter of the valve stem 24 providing for a seal between the stem 24 and the housing 21. The seal may be any suitable type providing for sufficient pressure drop. Suitable seals are, for example, a laminar seal or a labyrinth seal. Typically in a laminar seal the clearance between the outer diameter of a valve stem and the bore must lie between 0.003 and 0.007 inch. Under these circumstances a significant pressure drop occurs between the high pressure vapor at the conduit 22 and the chamber 28. For example, at an inlet gas pressure of 500 pounds per square inch the pressure within chamber 28 should be less than 100 pounds per square inch. In order to prevent accumulation of pressure within the chamber 28 the vent tubing 16 must be connected to a low pressure portion of the system such as the condenser of the engine. A suitable inner diameter for the low pressure tube 16 is 0.181 inches.

It will be apparent that the pressure drop between the input conduit 22 the chamber 28 is a function both of the constriction imposed by the laminar seal 27 and the size of the orifice of the vent tube 16, as well as the pressure to which the vent tube 16 is connected. While increasing the size of the vent tube 16 and hence the flow of the gas out of chamber 28, tends to decrease the pressure within this chamber, it also tends to decrease the efficiency of the engine cycle, since the vented vapor constitutes working fluid which is not processed through the expander, but is rather bypassed around the expander and recycled back through the condenser and evaporator. Hence any significant amount of fluid so bypassed will significantly reduce the efficiency of the engine. An upper limit for this bypass flow should be established at approximately 5 percent.

Figure 3:
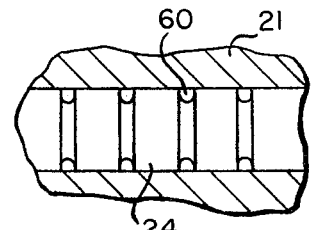
FIG. 3 is an illustration in cross sectional view of an alternative sealing arrangement for a portion of the valve of FIG. 2.

In FIG. 3 an alternative form of seal for this portion of the valve is illustrated. As there shown the stem 24 is formed with a series of grooves 60, so that the seal along the stem is a labyrinth seal.

A throttle valve of the above type has been operated with a stepping motor under conditions where the total travel of the valve stem 24 was 0.150 inches, corresponding to 240 steps of the stepping motor. The maximum opening area for the valve at full open was 0.08 square inches and the contour of the tip 25 was arranged to provide for a constant percentage flow variation with percentage change in stroke. Such a valve was operated with a pressure below 100 pounds per square inch absolute at the bellows with temperatures between 300°F and 500°F at the bellows. The pressure at the inlet conduit 22 is in the order of 500 pounds per square inch. The valve required a peak force of 10 ounce, inches to overcome the maximum gas pressure on the tip 25 of the stem 24 and the included friction requires an additional 30 ounce, inches of force to overcome the resistance throughout the valve. The suitable stepping motor for operating this valve is a series 20–3424E 200 stepping motor which develops 60 ounce, inches and which is available from Sigma Instruments Inc. of Braintree, Massachusetts.

What is claimed is:

1. In a closed fluid cycle engine having an expander, a condenser, an evaporator and a throttle valve passing fluid at high pressure and temperature from the evaporator to the expander, and wherein said fluid is passed at lower pressure from said expander to said condenser, the improved throttle valve construction comprising, a valve housing having a fluid input conduit and a fluid output conduit, a valve seat in the region of said conduits, an elongated valve stem extending through said housing and mounted for reciprocal motion along its longitudinal axis, one end of said valve stem engaging said seat to fully close said valve when said stem is at one limit of its reciprocal motion and being withdrawn from said seat to allow fluid flow from said inlet conduit to said output conduit when it is moved away from said limit of its reciprocal motion, a bellows seal hermetically connecting the opposite end of said valve stem to said valve housing, said housing being formed with an elongated bore surrounding said valve stem and an enlarged chamber surrounding said bellows seal, the elongated bore having dimensions such as to provide a significant pressure drop between the fluid volume surrounding said valve seat and the fluid volume in said enlarged chamber, said chamber being formed with an outlet conduit connecting to one of said lower pressure portions of said engine.

2. An improved valve construction in accordance with claim 1 wherein said elongated opening in said housing forms a laminar seal around said valve stem.

3. An improved valve construction in accordance with claim 2 wherein said elongated opening has a clearance around said valve stem of less than 0.007 inches.

4. A valve construction in accordance with claim 1 wherein said working fluid of said engine enters the valve as a gas at a temperature between 400° and 800°F and a pressure of between 100 and 1000 pounds per square inch absolute and wherein the pressure of gas within said chamber surrounding said bellows is substantially less than 100 pounds per square inch absolute.

5. A valve construction in accordance with claim 1 wherein the fluid flow along said bore through said chamber to said outlet conduit is no more than 5 percent of the volume of fluid passing through said throttle valve.

* * * * *